(12) United States Patent
Roden, III

(10) Patent No.: US 6,801,951 B1
(45) Date of Patent: Oct. 5, 2004

(54) SYSTEM AND METHOD FOR FAULT-TOLERANT CLOCK SYNCHRONIZATION USING INTERACTIVE CONVERGENCE

(75) Inventor: Thomas Gilbert Roden, III, New Windsor, MD (US)

(73) Assignee: Honeywell International Inc., Morristown, NJ (US)

( * ) Notice: Subject to any disclaimer, the term of this patent is extended or adjusted under 35 U.S.C. 154(b) by 758 days.

(21) Appl. No.: 09/677,155

(22) Filed: Oct. 2, 2000

Related U.S. Application Data
(60) Provisional application No. 60/158,471, filed on Oct. 8, 1999.

(51) Int. Cl.[7] ............................. G06F 15/16; G06F 1/12
(52) U.S. Cl. ...................................... 709/248; 713/400
(58) Field of Search ........................... 714/12; 709/400, 709/204, 248; 370/509, 506; 713/500, 400; 375/356

(56) References Cited

U.S. PATENT DOCUMENTS

| | | | |
|---|---|---|---|
| 5,146,585 A | | 9/1992 | Smith, III .................... 395/550 |
| 5,327,468 A | * | 7/1994 | Edblad et al. ............... 375/356 |
| 5,537,583 A | * | 7/1996 | Truong ........................ 713/500 |
| 5,768,282 A | * | 6/1998 | Ohara et al. ................ 370/506 |
| 5,875,320 A | * | 2/1999 | Gu .............................. 709/400 |
| 5,903,717 A | * | 5/1999 | Wardrop ...................... 714/12 |
| 6,104,770 A | * | 8/2000 | Yama ........................... 375/368 |
| 6,665,316 B1 | * | 12/2003 | Eidson ........................ 370/509 |

FOREIGN PATENT DOCUMENTS

| | | | | |
|---|---|---|---|---|
| WO | WO 88 08161 A | 10/1988 | ............ | G06F/11/20 |
| WO | WO 99 38287 A | 7/1999 | ............. | H04L/7/03 |

OTHER PUBLICATIONS

D.L. Mills, "Improved Algorithms for Synchronizing Computer Network Clocks", Computer Communications Review, US, Association for Computing Machinery, New York, vol. 24, No. 4, Oct. 1, 1994, pps. 317–327, XP000477058, ISSN: 0146–4833, Abstract, Chapter 3.

* cited by examiner

Primary Examiner—John Follansbee
Assistant Examiner—Kenny Lin
(74) Attorney, Agent, or Firm—Matthew Luxton; James W. Falk

(57) ABSTRACT

A method for synchronizing nodes in a network is described that utilizes an interactive convergence technique. The technique utilizes communications protocol IEEE 1394 to broadcast each node's clock value to the other nodes in the network. Each node applies a voting algorithm to the set of broadcasted clock values to determine a voted clock value and each node's clock is set to that voted clock value. When a node's clock value is close in value to another node, those nodes are considered to be synchronized. The set of clock values to be used to determine the voted clock value consists of those nodes that are synchronized. The technique is implemented on hardware separate from the node's hardware and can be implemented on a field programmable gate array.

15 Claims, 3 Drawing Sheets

SYSTEM AND METHOD FOR FAULT-TOLERANT CLOCK SYNCHRONIZATION USING INTERACTIVE CONVERGENCE

RELATED PATENTS AND APPLICATIONS

This application claims the benefit of U.S. Provisional Application 60/158,471 filed on Oct. 8, 1999.

FIELD OF INVENTION

The present invention relates to the field of computer synchronization and in particular to a system and method for synchronizing multiple nodes on a network that utilizes a convergence technique.

BACKGROUND OF INVENTION

For any network system, synchronization of each node within the network is important to ensure that the network functions smoothly. Nodes that are not synchronized can cause disturbances within the network as miscommunication can occur between the nodes.

Any synchronization implementation needs to be as reliable as possible. However, the more reliable that a synchronization implementation is, usually the more complicated the implementation of that technique tends to be as well.

For example, prior synchronization algorithms have been based on the concept of interactive convergence through local timestamping of broadcasted messages. The synchronization algorithm had to infer the value of the remote node's clock to arrive at a voted and globally consistent clock. This approach, while proven to be fault-tolerant, is inherently complex and resource intensive.

In addition, implementing a synchronization algorithm mainly through software on the node's processor imposes requirements on the hardware of the node itself. The node could be required to have high quality hardware to implement the synchronization software to be able to maintain high reliability of the synchronization procedure. This high quality requirement greatly increases the cost of the implementation overall and sometimes is unnecessary to perform the intended functions of the network.

As such, there exists a need for a synchronization method to effect synchronization of the nodes of a network that will have sufficient features to ensure reliable synchronization while reducing the complexity of the implementation and lowering the high quality standards for hardware.

SUMMARY OF THE INVENTION

This invention utilizes a hardware implementation separate from the network node to synchronize each network node. Synchronization of the network is implemented in a Redundancy Management System (RMS) that can interface with common communication techniques within the network in conjunction with a Field Programmable Gate Array (FPGA) to implement the synchronization algorithm. The invention also exploits the ability of some communication protocols, such as IEEE 1394, to periodically broadcast their local clocks, forming a distributed global database and simplifying the synchronization process. The algorithm uses interactive convergence techniques to arrive at a globally consistent clock.

In accordance with one embodiment of the invention, a method for synchronizing nodes in a network is described that comprises the steps of broadcasting the clock value of each node on the network; determining a voted clock value based on a set of the clock values that were broadcast; comparing the clock value of each node to determine which nodes are synchronized with each other; resetting each node's clock to the voted clock value; and setting flags to indicate which nodes are synchronized.

In accordance with another embodiment of the invention, a system to synchronize nodes in a network is described that comprises a clock broadcaster to broadcast the clock values of each node in the network to all other nodes in the network; a clock voter to determine a voted clock value based on a set of the clock values that were broadcast; a clock setter to set the clock values of each node in the network to the voted clock value; an array of clock timers to store each of the clock values that have been broadcast; a clock comparer to determine which nodes are synchronized based on the clock values stored in the array; and a synchronization indicator to designate the nodes that are synchronized.

In accordance with another embodiment of the invention, an apparatus to synchronize nodes in a network is described that comprises a communication interface associated with each node in the network, the interface capable of broadcasting a clock value of the associated node and receiving the clock values that have been broadcast; a plurality of logic gates associated with each node; the logic gates arranged to be able to determine a voted clock value based on a set of the clock values that have been broadcast and arranged to be able to determine which nodes are synchronized by comparing the clock values; and a memory register associated with each node to store flags indicating the synchronization status of each node.

DESCRIPTION OF THE INVENTION

Figure 1:
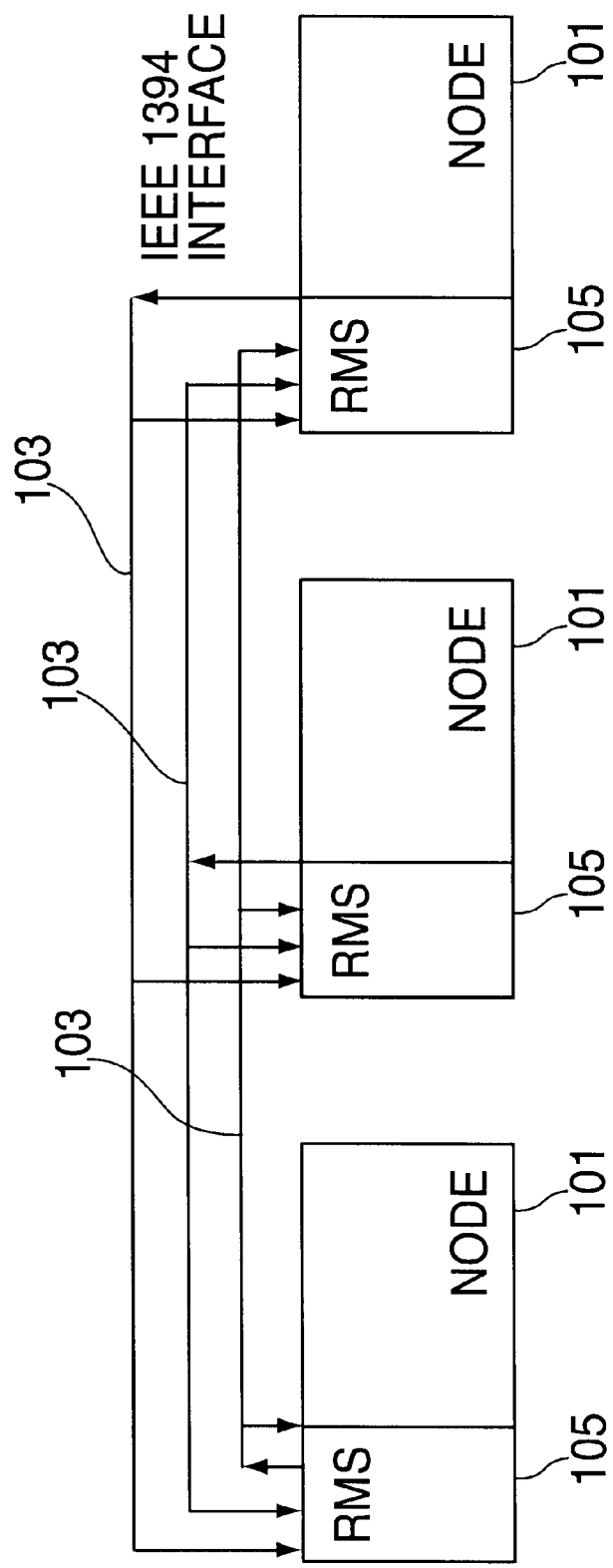
FIG. 1 is a layout of a prior art network that utilizes one embodiment of the present invention.

FIG. 1 depicts a typical network system that utilizes my invention. Network nodes 101 are connected through communication buses 103 to form the network system. Associated with each network node is a redundancy management system (RMS) 105 that performs many fault tolerant functions including synchronization of the nodes 101 within the network. The RMS 105 can utilize logic gates to implement certain synchronization functions through a field programmable gate array (FGPA).

The communication buses 103 between the nodes can utilize communication protocols such as IEEE 1394 that can be utilized in the present invention. IEEE 1394 is a hardware and software standard for transporting data at 100, 200, or 400 megabits per second (Mbps). One useful feature of the IEEE 1394 communication protocol is the ability to periodically broadcast the nodes' local clocks.

Figure 2:
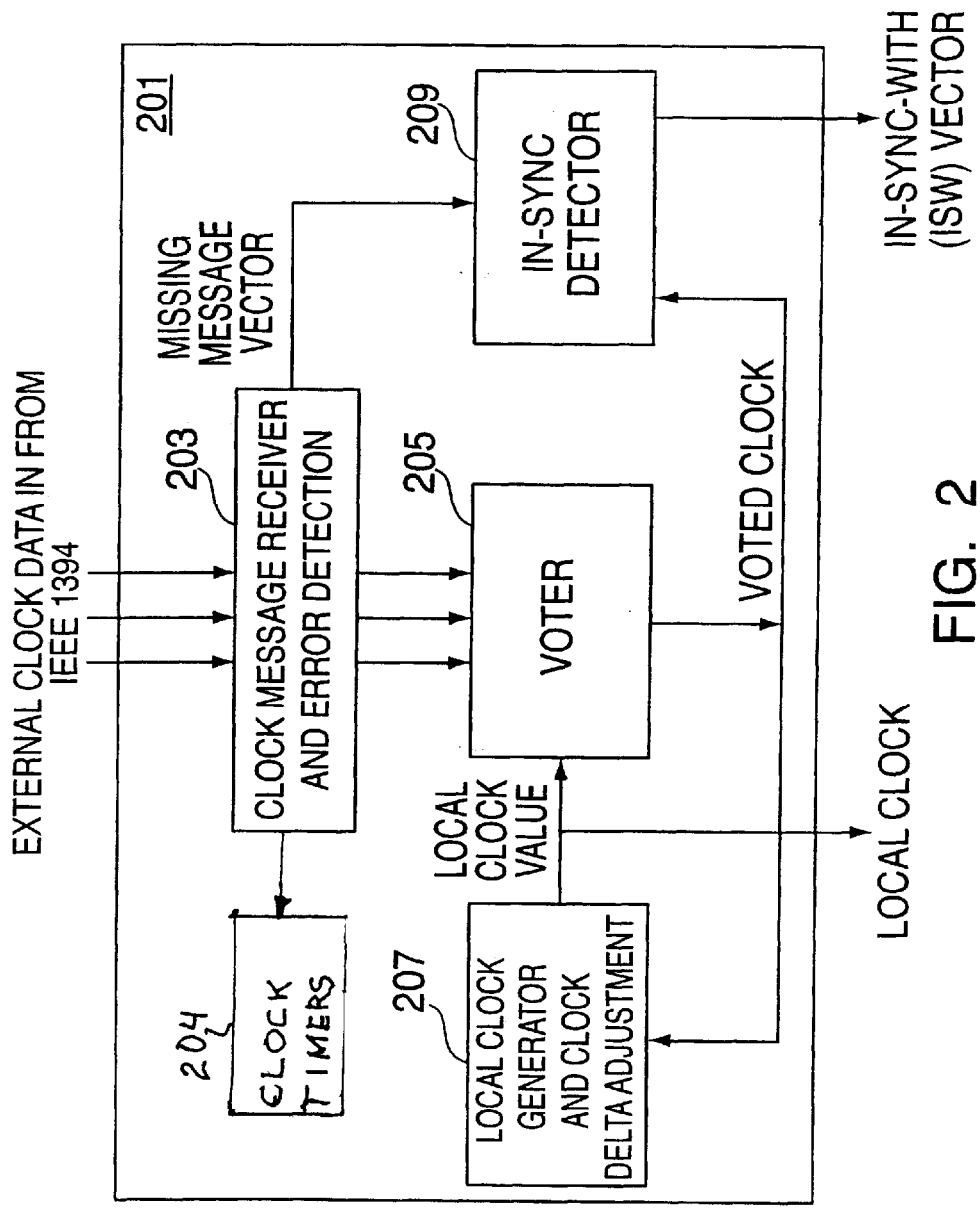
FIG. 2 is diagram layout of the functional components of one illustrative embodiment of the present invention.

FIG. 2 depicts the functional components of one illustrative embodiment of a system 201 in accordance with my invention and comprising a part of the redundancy management system 105 shown in FIG. 1. In accordance with my invention, all of the structural elements of system 201 are implemented by a field programmable gate array.

The system 201 has a clock receiver module 203 that accepts clock values broadcasted from the other nodes in the network. The clock receiver module 203 stores each clock value into a timer that corresponds to that node. The clock receiver module 203 maintains an array of clock timers 204 for all the nodes in the network. Once stored, each clock value is incremented according to that node's internal tick frequency.

The system 201 also has a voter module 205 that determines the correct clock value to be used by all of the nodes in the network. The voter module 205 applies a voting algorithm to the clock timers in the array to arrive at the voted clock value. Each node applies the same algorithm in that determination. Since each node will receive the same clock values from the other nodes in the network and apply the same algorithm, each voter module 205 will arrive at the same voted clock value.

The voting algorithm used is a fault-tolerant mid-value select algorithm. The voted clock is the average of the extreme values of set $X_f$ as shown in the following equation:

$$\text{mid}(X) = \frac{\max(X_f) + \min(X_f)}{2}.$$

Set $X_f$ is not necessarily all of the clock values in the array. Depending on when the voting takes place, the set of clock values can be restricted to those clock values pertaining to nodes that are synchronized with another node. In the initial synchronization round, all of the nodes can potentially be included in the set. After it has been determined that some nodes in the network are synchronized, only those nodes will be considered in the voting algorithm.

In addition, faulty values can be excluded from the operative set. The following equation describes the formation of the set of clock values to be used.

$$\forall |X| \geq \max(2, 3f) X_f = \text{reduce}(X)$$

The set X has a minimum number of clock values greater than or equal to the maximum of either two clock values or three times the number of faulty clock values in the set. Faulty values are clock values from nodes that are misrepresentations of its clock value and have a large variation from the other clock values. Discarding the faulty extreme values from the set X forms the reduced set $X_f$.

System 201 has a clock seeing module 207 that directly interacts with the node's clock. Clock setting module 207 is capable of obtaining the clock value of the node and broadcasting the clock value to the other each of the nodes. Clock setting module 207 also can set the local clock of the node to the voted clock value.

An in-sync detector module 209 is also part of system 201. The in-sync detector module 209 compares the clock values to determine the synchronization status and manages the flags that indicate whether a node is synchronized with other nodes.

Synchronization is based on the concept of an atomic period composed of a finite number of indivisible ticks. The atomic period determines the synchronization interval and the number of ticks determines the synchronization precision. The smallest clock adjustment that can be made is one tick, therefore the number of ticks in an atomic period ultimately determines the synchronization jitter.

There is one synchronization cycle and hence one clock adjustment per atomic period. Synchronization jitter is substantially determined by the accuracy of the crystal oscillator driving the local timers and by the broadcasted clock latency.

When the in-sync detector module 209 for a node determines that it is synchronized with at least one other node, the clock for that node is reset to a starting clock value (typically 0) and the in-sync detector module 209 sets its "IN_SYNC" flag to true. A node is in sync with another node when the difference between its clock, measured in hardware timer ticks, and the other node's clock is less than an application-dependent tick tolerance.

Figure 3:
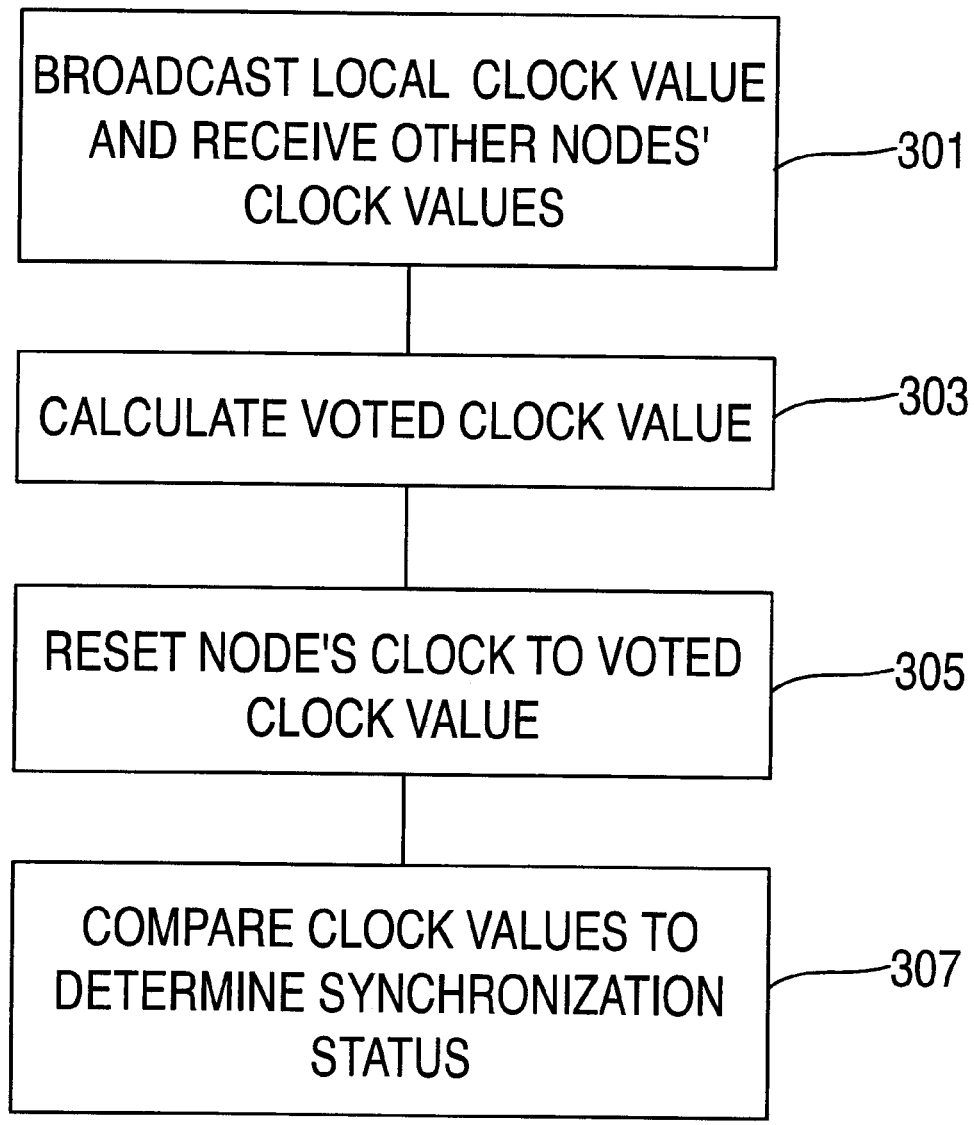
FIG. 3 is a flow chart depicting the synchronization process in accordance with one embodiment of the present invention.

FIG. 3 depicts a flow chart that describes the operation of the invented system in synchronizing the individual nodes of the network. In the first step 301, each node will broadcast its clock value to all the other nodes. During step 301, each node will be receiving the clock values of the other nodes.

Broadcasting the clock value to other nodes occurs periodically after a set time interval has passed. That time interval should be large enough to allow clock values from all the nodes to be broadcast and received. The invented system utilizes the IEEE 1394 protocol's ability to periodically broadcast the nodes' local clock. Although the local clock is broadcast after a set time interval pursuant to the IEEE 1394 protocol, the time it is broadcast is controlled by the invented system since it sets the nodes' local clock which triggers the broadcast. Along with each clock value broadcast, each node will broadcast its in-sync flag. If synchronization is occurring for the first time, the value of the in-sync flags is set to false.

After receiving the clock values and in-sync status from the other nodes, the next step 303 is to calculate the voted clock value. The voting is usually performed near the middle of each atomic period. Each node then resets its clock value to that voted clock value in step 305.

In step 307, each node compares the clock values from all of the nodes in the network to determine the in-sync status. The clock values to be compared are the values that have been stored in the corresponding timers and not the clock values that have been readjusted in step 305. By comparing these stored values, each node can determine which nodes of the network have synchronized clock tickers.

The steps outlined in FIG. 3 are continually repeated to ensure synchronization. By restricting the set of clock values by which the voted clock value is determined to those nodes that are synchronized with each other, each iteration of the steps will bring the voted clock to a value consistent with the most nodes.

The steps detailed in FIG. 3 can be implemented in hardware through a FPGA. By having a separate hardware system to implement the synchronization process, the quality requirements on each node's processors are not as high and can be set at the level sufficient to perform the main purposes of the network.

Implementing the synchronization process on a FPGA can be accomplished by encoding the following function onto the gate array.

```
FUNCTION{1}]Synchronize( )
SYNC_TIME    tick_pos;
COUNT        in_sync;
tick_pos = REMAINDER(g_local_clk, SYN_PREC);
IF{1} (tick_pos.EQ.PERIOD_START)
    IF{2} (g_first_to_sync.EQ.TRUE)
        g_local_clk = STARTING_CLOCK
        _VALUE;
        g_first_to_sync = FALSE;
    END IF{2}
    g_in_sync_flag = g_next_sync_flag;
    IF{3} (g_listen.LT.LISTEN_TIME)
        INCREMENT(g_listen);
    END IF{3}
ELSE IF{1} (tick_pos.EQ.SYNC_RUN
            .AND.g_rcvd[OWN_NID].EQ.
            AS_RCVD    .AND.g_listen
            .EQ.LISTEN_TIME)
    Reset_Sync_Flag(g_local_clk);
    Compute_Clock( );
    TEMPORARY COUNT i = 0;
    TEMPORARY SYNC_TIME delta;
    in_sync = 0;
    WHILE{1} (i.LT.NUM_NODES)
        g_rcvd[i] = NOT_RCVD;
        delta = Get_Delta(g_global_clks[i],
        g_global_clks[OWN_NID]);
        IF{4} (delta.LE.SYN_TOL)
            INCREMENT(in_sync);
        END IF{4}
        INCREMENT(i);
    END WHILE{1}
    IF{5} (in_sync.GE.2)
        Set_Sync_Flag(g_local_clk);
        IF{6} (g_nodes_in_sync.NE.0)
            g_next_sync_flag = IN_SYNC;
        END IF{6}
    ELSE{5}
        g_next_sync_flag = NO_SYNC;
        g_first_to_sync = FALSE;
    END_IF{5}
END IF{1}
END FUNCTION{1}
FUNCTION{2} Get_Delta(SYNC_TIME clk1, SYNC_TIME clk2) RETURNS
SYNC_TIME
Reset_Sync_Flag(clk1);
Reset_Sync_Flag(clk2);
RETURN ABSOLUTE_VALUE(clk1–clk2);
END FUNCTION{2}
FUNCTION {3} Compute_Clock( )
SYNC_TIME local_delta, voted_clk;
SYNC_TIME clk_array[NUM_NODES];
SYNC_TIME in_sync_clk_array[NUM_NODES];
COUNT msgs_rcvd, in_sync_msgs_rcvd, i, j, k;
BOOLEAN_FLAG is_in_sync = NO_SYNC;
i = 0;
j = 0;
k = 0;
msgs_rcvd = 0;
in_sync_msgs_rcvd = 0;
WHILE{1} (i.LT.MAX_NODES)
    IF{1} (g_rcvd[i].EQ.WAS_RCVD)
        IF{2} (Test_Sync_Flag(g_global_clks[i]).EQ.TRUE)
            in_sync_clk_array[k] = Reset_Sync_Flag(g_global_clks[i]);
            INCREMENT(k);
            INCREMENT(in_sync_msgs_rcvd);
            IF{3} (i.EQ.OWN_NID)
                is_in_sync = IN_SYNC;
            END IF{3}
        END IF{2}
        clk_array[j] = Reset_Sync_Flag(g_global_clks[i]);
        INCREMENT(j);
        INCREMENT(msgs_rcvd);
    END IF{1}
    INCREMENT(i);
END WHILE{1}
IF{4} (in_sync_msgs_rcvd.GE.2)
    IF{5} (g_nodes_in_sync.EQ.0.AND.is_in_sync.EQ.IN_SYNC)
        g_first_to_sync = TRUE;
```

```
        END IF{5}
        g_nodes_in_sync = in_sync_msgs_rcvd;
        SORT(in_sync_clk_array);
        IF{6} (in_sync_msgs_rcvd.EQ.4)
            voted_clk = (in_sync_clk_array[1] + in_sync_clk_array[2])/2;
        ELSE IF{6} (in_sync_msgs_rcvd.EQ.3)
            voted_clk = in_sync_clk_array[1];
        ELSE IF{6} (in_sync_msgs_rcvd.EQ.2)
            voted_clk = (in_sync_clk_array[0] + in_sync_clk_array[1])/2;
        END IF{6}
    ELSE{4}
        SORT(clk_array);
        IF{7} (msgs_rcvd.EQ.4)
            voted_clk = (clk_array[1] + clk_array[2])/2;
        ELSE IF{7} (msgs_rcvd.EQ.3)
            voted_clk = clk_array[1];
        ELSE IF{7} (msgs_rcvd.EQ.2)
            voted_clk = (clk_array[0]+ clk_array[1])/2;
        ELSE IF{7} (msgs_rcvd.EQ.1)
            voted_clk = clk_array[0];
        ELSE IF{7} (msgs_rcvd.EQ.0)
            voted_clk = local_clk;
        END IF{7}
    END IF{4}
    local_delta = voted_clk - g_local_clk;
    g_local_clk = g_local_clk + local_delta;
END FUNCTION{3}
```

The code is presented as a block-structured pseudo-language with the following conventions:

Language keywords and relational operators are UPPERCASE and are presented in courier bold TYPEFACE.

Constants are UPPERCASE and are presented in courier TYPEFACE.

Comments begin with a double-slash (//), continue to the end of the line, and are presented in the courier italic typeface.

Global variables are prefixed with a g_ as in g_local_clk.

Flow control statements are annotated with a numeric value enclosed in curly braces for readability (i.e. IF{1}(expression) begins an IF flow control statement and END IF{1} ends the statement).

The language operators are as follows:

| | |
|---|---|
| SORT(array) | Sorts array yielding array[n] $\leq$ array[n + 1] . . . |
| REMAINDER(A, B) | Returns the remainder of A ÷ B |
| ABSOLUTE_VALUE(A) | Returns the integer absolute value of A |
| INCREMENT(A) | Increments A, i.e. A = A + 1 |
| A.EQ.B | Equivalence, returns true if A $\equiv$ B |
| A.NE.B | Not equal, returns true if A $\neq$ B |
| A.LT.B | Less than, returns true if A < B |
| A.GT.B | Greater than, returns true if A > B |
| A.LE.B | Less or equal, returns true if A $\leq$ B |
| A.GE.B | Greater or equal, returns true if A $\geq$ B |
| A.AND.B | Logical AND, returns true if A $\hat{\ }$ B |
| A.OR.B | Logical OR, returns true if A $\check{\ }$ B |

The first section of the pseudo-code defines constants, special types and global variable declarations. The comments within this section describe the purpose of each declaration.

| | |
|---|---|
| CONSTANT TRUE = 1; | // *Boolean true value* |
| CONSTANT FALSE = 0; | // *Boolean false value* |
| CONSTANT SYN_PREC = 1000; | // *Ticks per atomic period* |
| CONSTANT PERIOD_START = 0; | // *Tick count at an atomic period* // *boundary* |
| CONSTANT STARTING_CLOCK_VALUE = 0; | // *Clock start value for initial* // *operating set* |
| CONSTANT SYNC_RUN = SYN_PREC * 0.10; | // *Sync function delay within an* // *atomic period* |
| CONSTANT NUM_NODES = 4; | // *Number of nodes in system* |
| CONSTANT LISTEN_TIME = 2; | // *Listening time on startup in* // *atomic periods* |
| CONSTANT OWN_NID = HDWR_SETTING; | // *Set by hardware strapping* |
| EQUIVALENCE WAS_RCVD TRUE; | // *WAS_RCVD is boolean true* |
| EQUIVALENCE NOT_RCVD FALSE; | // *NOT_RCVD is boolean false* |
| EQUIVALENCE IN_SYNC TRUE; | // *IN_SYNC is boolean true* |
| EQUIVALENCE NO_SYNC FALSE; | // *NO_SYNC is boolean false* |
| TYPE SYNC_TIME IS INTEGER: 32 BITS; | // *The clock type (32 bits)* |

-continued

| | | |
|---|---|---|
| TYPE BOOLEAN_FLAG IS UNSIGNED: 1 BIT; | | // A boolean flag |
| TYPE COUNT IS INTEGER: 32 BITS; | | // An integer count (32 bits) |
| SYNC_TIME | g_local_clk = 0; | // The local node's timer |
| SYNC_TIME | g_global_clks[NUM_NODES]; | // The clock database |
| BOOLEAN_FLAG | g_first_to_sync = FALSE; | // Indicates that this node is a // member of the first operating // set |
| BOOLEAN_FLAG | g_in_sync_flag = FALSE; | // This node is in sync |
| BOOLEAN_FLAG | g_next_sync_flag = FALSE; | // This node will be in sync at the // next atomic period boundary |
| BOOLEAN_FLAG | g_rcvd[NUM_NODES] = FALSE; | // Indicates that a clock message // was received from a node. |
| COUNT | g_nodes_in_sync = 0; | // The number of nodes that this // node believes are in sync |
| COUNT | g_listen = 0; | // Startup delay counter |

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

What is claimed is:

1. A method for synchronizing nodes in a network, each node including an array of clock timers for storing clock values, said method comprising the steps of:
   broadcasting the clock values of each node to all nodes in the network;
   storing in the clock timers at each node the clock values broadcast to said each node from all the nodes in the network;
   determining at each node by a voting algorithm a voted clock value for said each node based on a set of the stored clock values that were broadcast to said each node;
   comparing the voted clock values of said each node to determine which nodes are synchronized with each other;
   resetting each node's clock to said voted clock value at said each node; and
   setting flags to indicate which nodes are synchronized, each node in said network separately performing said broadcasting, storing, determining, comparing, resetting, and setting steps.

2. The method as claimed in claim 1, wherein said set of clock values comprises nodes that are indicated to be synchronized by said flags.

3. The method as claimed in claim 1, wherein said determining step is implemented on a field programmable gate array.

4. The method as claimed in claim 1, wherein said broadcasting step is implemented on a field programmable array.

5. The method as claimed in claim 1, wherein said broadcasting, storing, determining, resetting, comparing, and setting steps are continuously repeated.

6. The method as claimed in claim 1, wherein the voting algorithm is a fault-tolerant mid-value voting algorithm.

7. The method as claimed in claim 1, wherein said comparing step is implemented on a field programmable gate array.

8. The method as claimed in claim 1, wherein said setting step is implemented on a field programmable array.

9. The method as claimed in claim 1 wherein the clock values stored in the clock timers at each node are incremented at said each node.

10. The method as claimed in claim 1 wherein said step of broadcasting clock values of each node includes broadcasting its associated flag.

11. In a network comprising a plurality of nodes which are to be synchronized, apparatus at each of said nodes for effecting such synchronization, said apparatus comprising:
   a local clock generator generating a local clock value;
   a clock message receiver including an array of clock timers for storing clock values broadcast to each said node from all the nodes in the network;
   a clock voter to determine by a voting algorithm a voted clock value based on the stored clock values; and
   an in-sync detector that compares the voted clock value and the local clock value from said local clock generator and resets the local clock with the voted clock value.

12. The apparatus in accordance with claim 11 wherein said in-sync detector manages flags that indicate whether a node is synchronized with other nodes in the network.

13. The apparatus in accordance with claim 11 wherein said voting algorithm is a fault-tolerant mid-value voting algorithm.

14. A system to synchronize nodes in a network, each of said nodes having apparatus associated therewith and comprising:
   a local clock generating a clock value;
   a clock broadcaster to broadcast the clock value of the node to all the nodes in the network;
   an array of clock timers for storing clock values that have been broadcast from all the nodes in the network;
   a clock voter to determine by a voting algorithm a voted clock value based on the stored clock values, said local clock being set to said voted clock value; and
   a clock comparer and synchronization indicator to determine which nodes are synchronized based on the clock values stored and the voted clock value and designating the nodes that are synchronized.

15. The system as in accordance with claim 14 wherein said voting algorithm is a fault-tolerant mid-value select algorithm.

* * * * *